Sept. 5, 1961  E. R. GUTZMER  2,998,740
PUNCHING AND NOTCHING DEVICE AND LEVER
OPERATED DRIVE MEANS THEREFOR
Filed Sept. 14, 1955  3 Sheets-Sheet 1
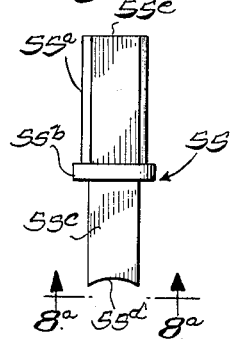
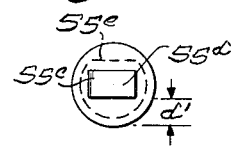
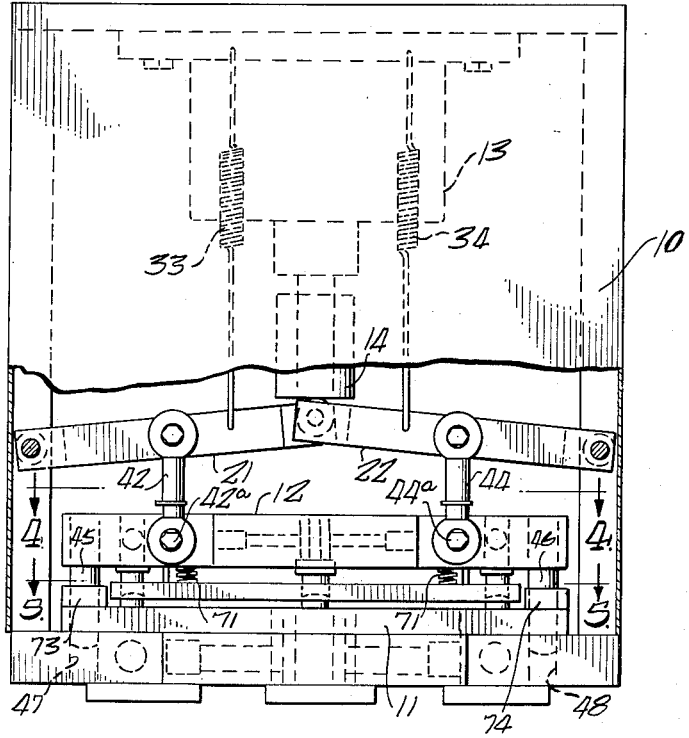
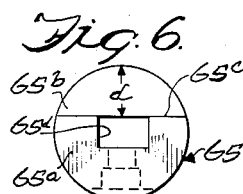
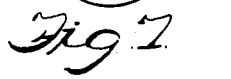
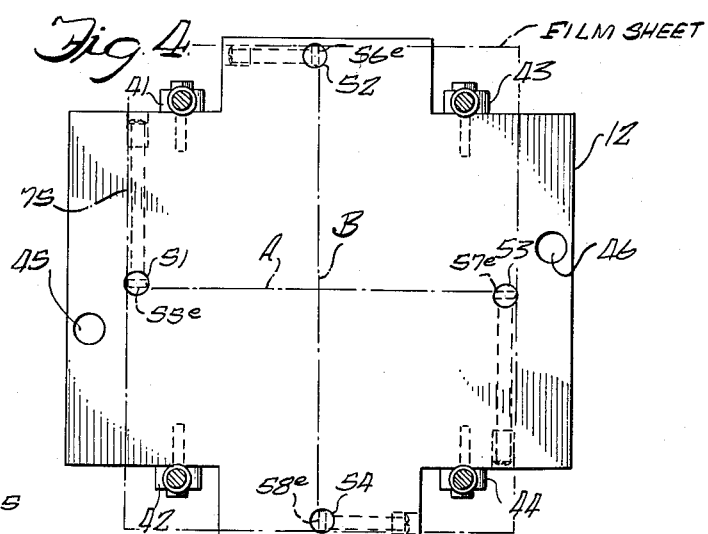
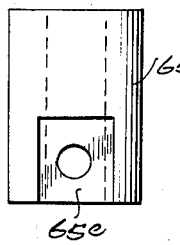
Inventor
Ernest R. Gutzmer
Carlson, Pitzner, Hubbard & Wolfe
Attorneys Sept. 5, 1961 E. R. GUTZMER 2,998,740
PUNCHING AND NOTCHING DEVICE AND LEVER
OPERATED DRIVE MEANS THEREFOR
Filed Sept. 14, 1955 3 Sheets-Sheet 2

Inventor
Ernest R. Gutzmer
Carlson, Pitzner, Hubbard + Wolfe
Attorneys

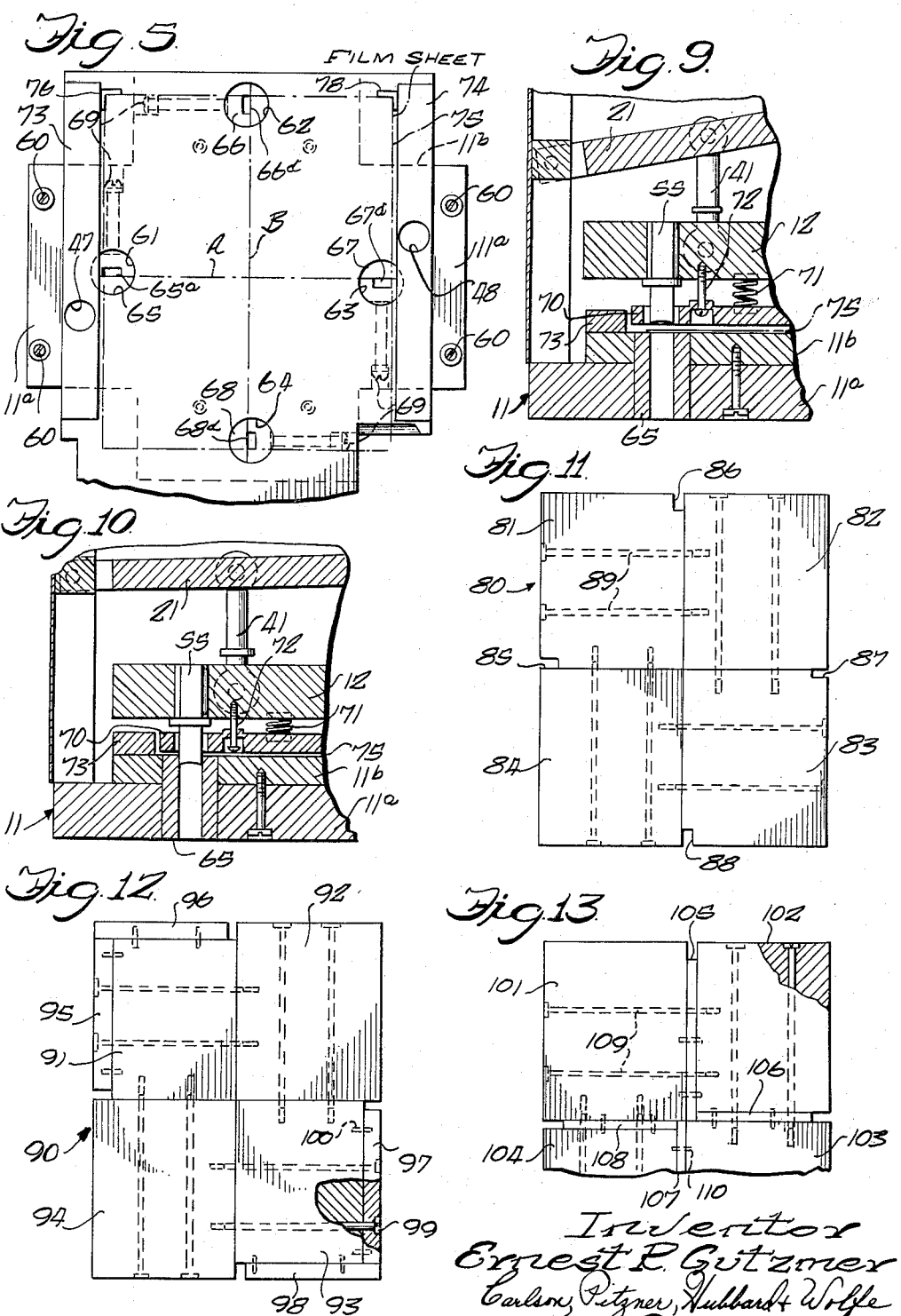

United States Patent Office 2,998,740
Patented Sept. 5, 1961

2,998,740
PUNCHING AND NOTCHING DEVICE AND LEVER OPERATED DRIVE MEANS THEREFOR
Ernest R. Gutzmer, Hinsdale, Ill., assignor to Intercompany Corporation, Chicago, Ill., a corporation of Illinois
Filed Sept. 14, 1955, Ser. No. 534,194
4 Claims. (Cl. 83—620)

The present invention relates to punching jigs and more particularly to apparatus for punching registering holes or notches in photographic film employed in the steps of color reproduction.

It is conventional practive to produce color reproductions by procedures which require extremely accurate register between images on two or more superimposed sheets of film. In Ozga application Ser. 493,640, filed on March 11, 1955, there is disclosed a registering procedure employing sheets of film notched at the periphery to provide reference edges which are alined with the respective center lines of the sheet of film to insure that the superimposed sheets are precisely registered at their centers in spite of dimensional changes which may come about due to atmospheric conditions.

It is an object of the present invention to provide a notching jig capable of forming the registering holes or notches in a sheet of film with a degree of accuracy which is much greater than that obtainable by punching or notching machines of conventional types. It is a related object of the invention to provide a punching jig which has a high degree of consistency from one notched sheet to the next permitting center register with an accuracy on the order of .001″ or better.

It is another object of the invention to provide a punching jig in which the die members are constructed in a novel fashion permitting a high order of accuracy without, however, adding unduly to the cost of the device. In this connection there are a number of specific die plate structures disclosed herein permitting the desired accuracy and each of which may be manufactured at a relatively low cost without using special machining techniques.

In one of the aspects of the invention it is an object to provide a punching jig having male and female die plates which are kept in perfect parallelism during the punching operation but which permits use of an actuator of the pneumatic or hydraulic type applying force at a single point.

Other objects and advantages of the invention become apparent upon reading the attached detailed description and upon reference to the drawings, in which:

FIGURE 1 is a front elevation of a notching jig constructed in accordance with the present invention and with portions of the casing or frame removed in order to show the details of the construction.

FIG. 4 is a top view of the male die plate taken along the line 4—4 in FIG. 1.

FIG. 5 is a top view of the female die plate taken along the line 5—5 in FIG. 1.

FIG. 6 is a top view somewhat enlarged of a split bushing employed in the female die plate of FIG. 5.

FIG. 7 is a side view of the bushing shown in FIG. 6.

FIG. 8 is a detailed elevational view of a male die member used in the male die plate.

FIG. 8a is a bottom view of a male die member looking along the line 8a—8a in FIG. 8.

FIG. 9 is a fragmentary section taken along the line 9—9 in FIG. 3 and showing the punch at the beginning of the punching operation.

FIG. 10 is a fragment similar to FIG. 9 but showing the dies fully engaged.

FIG. 11 shows a composite female die plate made up of four separately machined pieces.

FIGS. 12 and 13 show alternate forms of female die plates.

While the invention has been described in connection with certain preferred embodiments, it will be understood that I do not intend to limit the invention thereto but intend to cover all modifications, alternatives and equivalents which may be included within the spirit and scope of the appended claims.

Figure 2:
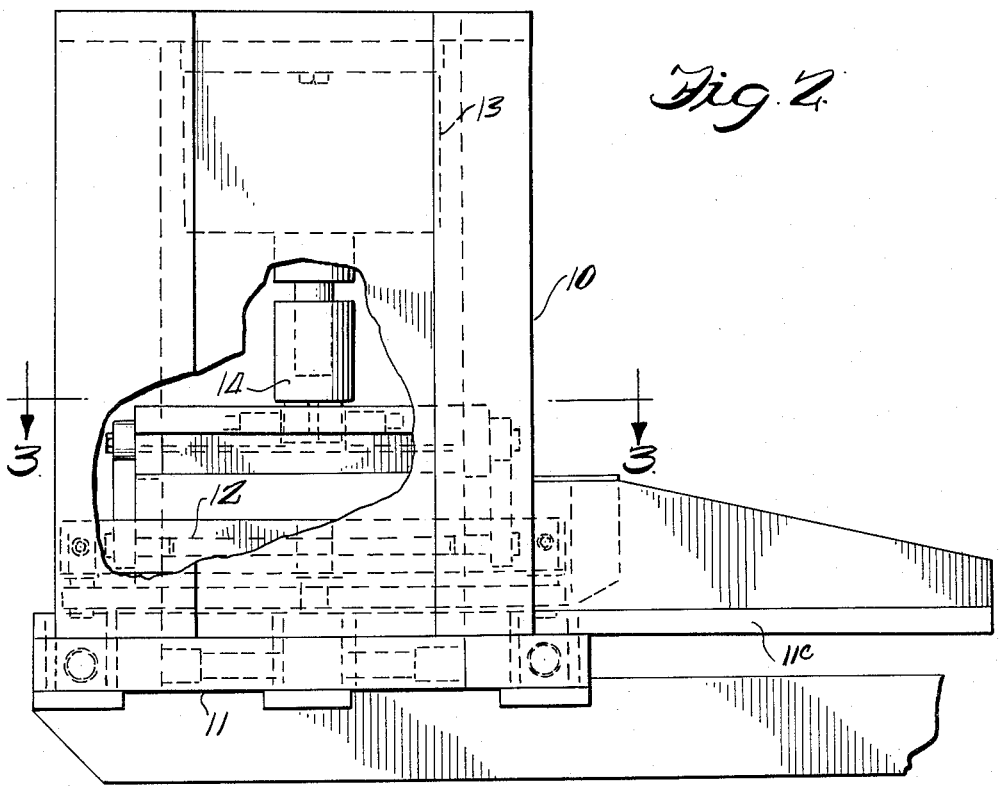
FIG. 2 is a side view of the device shown in FIGURE 1.
Figure 3:
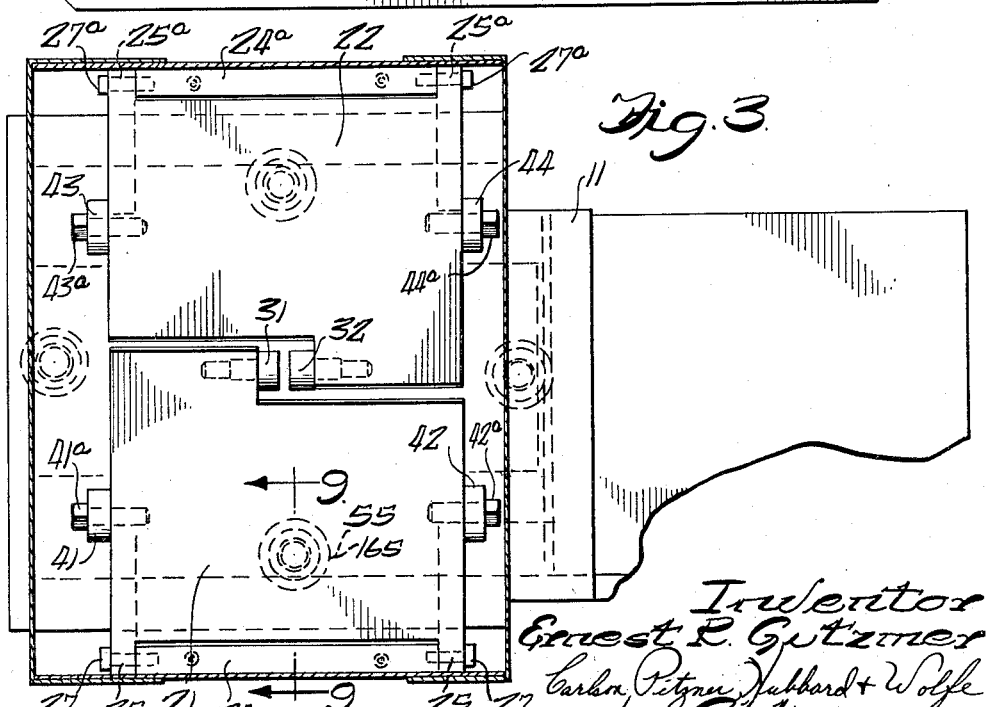
FIG. 3 is a view taken along the line 3—3 in FIG. 2.

Turning now to FIGS. 1–3 there is disclosed a jig having a frame 10 mounting a female die plate 11 cooperating with a movable male die plate 12. For reciprocating the male die plate an actuator 13 is provided which is preferably of the pneumatic type having a plunger 14.

For the purpose of supporting the male die plate 12 in a perfectly flat position and to prevent skewing during the course of movement, a novel suspension is provided in the form of a pair of butterfly plates 21, 22 (FIG. 3). The plates are pivoted at opposite sides of the frame for rocking about spaced horizontal axes. For this purpose supports 24, 24a, respectively, are provided, the butterfly plates being notched out to provide a pair of ears or brackets 25, 25a. The latter are drilled to receive screws 27, 27a.

In order to permit central application of actuating force, the plates 21, 22 are notched out at opposite ends and arranged in axially offset and overlapping relation shown in FIG. 3. Pinned to the inner edges of the plates are rollers 31, 32, respectively, which lie closely adjacent one another in the path of movement of the plunger 14 of the actuator. The butterfly plates are normally biased to their upward position (FIG. 1) by means of springs 33, 34.

To support the male die plate 12 the latter is suspended by drop links 41, 42 pinned along the middle of the butterfly plate 21 and links 43, 44 similarly secured to the butterfly plate 22. The links are secured to the plate 12 by means of suitable screws 42a—44a. The plates are, furthermore, alined with respect to one another by a pair of guide pins 45 and 46 which are anchored in the male die plate and extend downwardly through registering apertures 47, 48 bored in the female die plate.

In operation downward movement of the plunger 14 pressing upon the rollers 31, 32 causes the butterfly plates 21, 22 to rock downwardly lowering the links 41—44 by the same amount thereby insuring that the male die plate remains in proper orientation during the entire punching stroke. As the butterfly plates rock downwardly there is also a component of motion in the horizontal direction which is taken up by slight lateral movement of the rollers 31, 32 relative to one another. Since the two butterfly plates do not swing far beyond the horizontal in either direction, each of the drop links remains practically vertical, although it will be apparent that the links are free to pivot slightly about their points of fastening in order to take up any horizontal component of movement.

More detailed attention may next be given to the male and female die plates shown in FIGS. 4 and 5, respectively. The male die plate is of generally rectangular outline but with corners notched out to facilitate attachment of the drop links 41—44 previously mentioned. Adjacent the edges of the die plate holes 51—54 are bored to receive male die members 55—58. Each of the die members is constructed as shown in FIGS. 8 and 8a which are elevation and end views, respectively. Taking the die member 55 by way of example, it includes a shank portion 55a which is received in the hole 51 and a flange portion 55b which seats against the underside of the die plate as shown in FIG. 1. Extending downwardly toward the female die plate is a cutting portion 55c of rectangular cross section having cutting edges 55d which are undercut to a desired radius. Each of the die members is flattened as indicated at 55e for engagement by a suitable bolt which is threaded into the die plate (see FIG. 4). The holes 51—54 are so arranged that lateral faces 55e—58e of the respective die members are accurately alined with transverse center lines A and B, the latter corresponding to the center lines 25, 26 in the copending Ozga application.

Turning next to the female die plate 11 (FIG. 5), it will be noted that it includes a base member 11a and a face member 11b secured flatly thereto by screws or the like (see especially FIGS. 2 and 5). The base member has screws 60 for anchoring to the frame of the device. The face member is extended to provide an apron 11c on which the sheets are supported while sliding them into punching position.

Extending vertically through the female die member 11 are holes 61—64 which receive inserts 65—68, respectively. These inserts are in the form of two-part bushings constructed in accordance with FIGS. 6 and 7. Taking the bushing 65 by way of example it will be seen that it is of generally cylindrical form consisting of two parts 65a and 65b separated by a parting line 65c. Accurately machined in the part 65a is a groove 65d dimensioned to receive the cutting portion 55c of the male die. A flat 65e is provided for engagement by screws 69 threaded into the edges of the base member 11a as shown in FIG. 5. These screws insure that the parts of the bushing are firmly clamped together and insure that the bushing is tightly seated in the bored hole. The bushings are so constructed that lateral edges of the apertures 65d—68d are precisely located on the center lines A and B.

In order to strip the sheet of film from the male die members after the punching operation is completed, a stripper plate 70 is used. This stripper plate is of the type well known in the art having registered openings for passage of the male die members and mounted on springs 71, lifting being effected by lift screws 72.

To limit downward movement of the male die plate bottoming stops are provided in the form of metal strips 73, 74.

The operation of the device will be apparent by referring to FIGS. 9 and 10, FIG. 9 being a sectional view taken through a pair of the die members 55, 65. The sheet of film indicated at 75 is inserted into position on top of the female die plate, the outline of the film being indicated by the dot-dash outline in FIGS. 4 and 5. For the purpose of locating the film for punching, suitable stops 76, 78 may be provided. When pressure is applied to the ram 13 the plunger 14 operates upon butterfly plates lowering the male die plate 12 to bring the die members into engagement as shown in FIG. 10. This movement compresses the stripper plate 70 into an upward or out of the way position. When the force of the ram is relieved the butterfly plates are urged upwardly by means of the associated springs 33, 34 withdrawing the male die members. The stripper plate 70 strips the film from the male die members permitting it to be slid endwise from the device.

As a result of the above arrangement of male and female die members it has been found that an order of accuracy may be achieved which is far beyond that attainable in conventional punching devices. Thus in making the female die plate the holes 61—64 may be drilled with ordinary drilling accuracy and then ground to the proper location and diameter by a suitable high speed small diameter grinding wheel. The outer surfaces of the bushings 65—68 may also be ground with a high order of accuracy to achieve a snug fit. Since each bushing is of split construction, all four surfaces bounding the aperture are accessible for grinding. The preferred procedure is to grind the aperture to proper dimension following which the outside surface may be ground to establish a desired distance d (FIG. 6) which is accurate to within ±0.0001 inch. With regard to the male die member (FIGS. 8 and 8a) the side faces of the cutting portion 55c are ground to establish a predetermined dimension d' with a high order of accuracy. The net result is that reference edges may be cut in the film which are in precise alinement with the center lines A and B and with an extremely high consistency from sheet to sheet permitting center register with an accuracy of better than .001".

The arrangement described above is preferred for punching or notching sheets 8" by 10" in size or larger. There are, however, a number of alternate forms of female die plate which may be successfully employed for a high order of accuracy for this size of sheet and particularly in the smaller sizes. Such alternate forms are shown in FIGS. 11-13. In FIG. 11 a composite plate 80 is disclosed having four sections 81—84. The section 81 is provided with notches 85, 86 while the section 83 has notches 87, 88 formed therein. The sections 81—84 are rectangular so that the parting lines correspond to the center lines A and B previously mentioned. The sections are held together by suitable bolts 89, thus locking the parts together into a rigid unit. The construction has the advantage that all grinding may be done before the device is assembled and all reference surfaces, particularly the surfaces which are alined with the center lines A and B are open and accessible. In short, all that is necessary for high accuracy at the reference edge is to use accurately machined rectangles. The notches need not be ground and may be milled with ordinary machining accuracy.

In the form of female die plate shown at 90 in FIG. 12 sections 91—94 are used together with auxiliary strips 95—98. The pieces 91—94 are ground accurately to size and all of the pieces are clamped together by bolts 99 as shown. The strips 95—98 are additionally locked in position by means of dowel pins 100. In the modified form shown in FIG. 13 the sections 101—104 are separated by strips 105—108 secured together by screws 109 and dowel pins 110. The high inherent accuracy of both of the embodiments just described is due to the fact that it is relatively easy to form simple blocks of metal having accurate dimensions and right angles, no additional machining being required.

It will be apparent to one skilled in the art that the alternate forms of female die plates (FIGS. 11-13) may be substituted in the device 10 and used with the same male die plate as previously described.

I claim as my invention:

1. In a machine for punching or notching sheets of photographic film, the combination comprising a female die plate, a male die plate alined in parallel relation to said female die plate, means for advancing male die plate toward said female die plate while retaining parallel orientation with respect to the female die plate, said female die plate including a set of four rectangular die plate components having accurately machined straight lateral edges and means for securing the components together to provide parting lines which are oriented along rectangular center lines, the components being so dimensioned and arranged as to define two pairs of notches having reference surfaces alined with said center lines respectively, and members secured to said components for defining the third edge of said notches.

2. In a machine for punching or notching sheets of photographic film, the combination comprising a female die plate, a male die plate alined in parallel relation to said female die plate, means for advancing male die plate toward said female die plate while retaining parallel orientation with respect to the female die plate, said female die plate including the first pair of die plate components having a rectangular profile, a second pair of die plate components having a rectangular profile but having a smaller dimension, means for securing said components together edge to edge with the first pair of components arranged diagonally with respect to said second pair of components, thereby to define opposed pairs of notches having reference edges alined with two rectangular center lines respectively.

3. In a machine for punching or notching sheets of photographic film, the combination comprising a female die plate, a male die plate alined in parallel relation to said female die plate, means for advancing male die plate toward said female die plate while retaining parallel orientation with respect to the female die plate, said female die plate including a set of four die plate components having an accurately machined rectangular outline, a set of four spacer bars, means for securing said components together in a cluster with said spacer bars sandwiched between them, said spacer bars having a length which is less than the dimension of said components so as to define two pairs of notches each of which has a lateral reference surface alined with a pair of rectangular center lines.

4. A machine for punching and notching sheets of photographic film comprising, in combination, a frame, a female die plate fixed in said frame and including abutting components having accurately machined straight lateral edges fitted together to define portions of intersecting rectangular center lines, one of said components adjacent each of said central line having a relieved portion allowing the edge of the adjoining component to define a parting edge precisely alined with said center lines, a movable male die plate arranged above and parallel to said female die plate and having punches with parting edges above and exactly opposed to said first mentioned parting edges, and means to move said male die plate downwardly while maintaining parallel orientation with the female die plate.

References Cited in the file of this patent
UNITED STATES PATENTS

| | | |
|---|---|---|
| 280,996 | Armstrong | July 10, 1883 |
| 632,237 | Charlton | Sept. 5, 1899 |
| 720,896 | Cornelius et al. | Feb. 17, 1903 |
| 738,787 | Fogarty | Sept. 15, 1903 |
| 1,082,985 | Wilder | Dec. 30, 1913 |
| 1,334,102 | Laird | Mar. 16, 1920 |
| 1,488,562 | Spauling | Apr. 1, 1924 |
| 2,192,531 | Grady | Mar. 5, 1940 |
| 2,204,413 | Hubbert | June 11, 1940 |
| 2,284,956 | Gardner | June 2, 1942 |
| 2,543,527 | Cyuris | Feb. 27, 1951 |
| 2,568,152 | Hermann | Sept. 18, 1951 |